Patented Mar. 16, 1937

2,073,826

UNITED STATES PATENT OFFICE 2,073,826

METHOD OF MAKING BORIDES

Clarence W. Balke, Highland Park, Ill., assignor to Ramet Corporation of America, North Chicago, Ill., a corporation of Illinois No Drawing. Application May 28, 1934
Serial No. 727,983.

5 Claims. (Cl. 75—137)

This invention relates to compositions having the hardness that is required for tools or wear resisting, acid resisting, or abrasive materials.

For so much of the subject matter disclosed and claimed herein which is also disclosed in my copending application, Serial No. 457,496, filed May 29, 1930, which has matured into Patent 1,968,067, dated July 3, 1934, I claim the priority of said application.

An object of the invention is the provision and production of a novel and an improved composition of boron with one or more hard refractory metals from the group consisting of tantalum and columbium.

Another object of the invention is the provision and production of a boride of one or more hard refractory metals from the group consisting of tantalum and columbium.

Other objects of the invention will be apparent from the following description.

The novel hard material of the invention comprises boron and one or more refractory metals from the group consisting of tantalum and columbium in suitable proportions to form a product including a boride or borides of refractory metal or metals and having certain properties desirable for tools or wear resisting, acid resisting, or abrasive materials. One such product has the boron and refractory metal or metals in the proportion of, for example, from less than one atom to two atoms of boron to about one atom of the refractory metal or metals mentioned above.

The proportions of from one to two atoms of boron to one atom of the refractory metal or metals represent in atomic percentages from 50 to 66.7 atomic per cent of boron to from 50 to 33.3 atomic per cent of tantalum and/or columbium. Expressed in percentages by weight, the foregoing formula gives from about 5.6% to 10.7% by weight of boron to from 94.4% to 89.3% by weight of tantalum; and/or from about 10.4% to 18.9% by weight of boron to from about 89.6% to 81.1% by weight of columbium.

The invention is not, however, limited to such specific proportions but contemplates smaller percentages of boron which have been found to possess desirable properties. For example, 3% by weight of boron to 97% by weight of the refractory metal or metals and 5% by weight of boron to 95% by weight of the refractory metal or metals result in products having properties found useful and desirable in, for example, tools, wear resisting and acid resisting materials.

In making the above described material, boron in the finely divided state is purified or degasified at about 1500° C. to volatilize any organic matter which may be contained therein and to rid the boron of objectionable gases. This boron powder and a powder of tantalum and/or columbium in the desired proportions are ground together in a ball mill to secure an intimate mixture of the powders.

The fine powder mixture just described is placed in a crucible of tantalum sheet having a tight fitting cover. The closed tantalum crucible with the mixed powders therein is packed in tantalum powder in a graphite crucible, whereby to exclude oxygen, nitrogen, or other embrittling gases from the powder mixture during the heating thereof.

After being packed in graphite, the loaded carbon crucible is heated preferably in a high frequency furnace. During this heat treatment the temperature in the furnace is slowly raised to about 2000° C. and this temperature is maintained for about one-half hour to combine the boron with the proper amount of the tantalum and/or columbium to form a boride or borides thereof. When the carbon crucible containing the powder mixture becomes red hot, a very vigorous reaction takes place.

While the product of the foregoing reaction is exceedingly hard and will readily scratch many of the hard metal alloys now used for the formation of cutting tools, it is desirable to convert all, or substantially all of the boron into a boride. To this end that product is ground in a ball mill for about twenty-four hours to a fine powder. The resulting fine powder may, if desired, be subjected to a forming pressure sufficient to hold the particles together during the evacuation of a chamber or furnace into which the ground powder is next placed for heating. Whether or not the powder product is pressed, it is heated to from 1600° C. to 1700° C. in a vacuum to degasify it and to complete the reaction which converts substantially all of the boron into one or more borides of tantalum and/or columbium.

Thus it will be seen that the novel composition of the invention is made by combining boron with one or more refractory metals from the group consisting of tantalum and columbium to form therewith a product including a boride or borides thereof and having the hardness and other properties desirable for tools or wear resisting, acid resisting, or abrasive materials.

While I have described a preferred embodiment of my invention, many modifications may be made without departing from the spirit of the invention, and I do not wish to be limited to the precise details hereinbefore set forth, but desire to avail myself of all changes within the scope of the appended claims.

Having thus described my invention, what I claim as new and desire to secure by Letters Patent of the United States, is:

1. A method of making borides which comprises grinding metal and purified boron together, heating the finely divided mixture of boron and the metal while excluding the embrittling gases therefrom to chemically combine said metal and boron, and degasifying the boride thus formed in a vacuum.

2. A method of making a boride of one or more metals from the group comprising tantalum and columbium which comprises heating a mixture of boron and said one or more metals to unite the boron and said one or more metals, and degasifying the mixture.

3. A method of making a boride of tantalum which comprises heating an intimate mixture of tantalum powder and boron to cause the tantalum to react with the boron, and heating the mixture in a vacuum to complete the reaction.

4. A method of making a composition of boron and one or more hard refractory metals from the group consisting of tantalum and columbium, which comprises heating a mixture of said one or more hard refractory metals and degasified boron to about 2000° C. and reheating the product in vacuo.

5. A method of making a boride of one or more hard refractory metals from the class including tantalum and columbium which comprises heating an intimate mixture of boron and a powder of said one or more hard refractory metals to cause the one or more hard refractory metals to react with the boron, and heating the mixture in a vacuum to complete the reaction.

CLARENCE W. BALKE.